(12) United States Patent
Modh et al.

(10) Patent No.: US 11,472,323 B2
(45) Date of Patent: Oct. 18, 2022

(54) FRAME STRUCTURE FOR A VEHICLE SEAT BACKREST

(71) Applicant: Volvo Car Corporation, Gothenburg (SE)

(72) Inventors: Lars Modh, Uddevalla (SE); Johan Wallmander, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/576,893

(22) Filed: Sep. 20, 2019

(65) Prior Publication Data
US 2020/0130547 A1 Apr. 30, 2020

(30) Foreign Application Priority Data
Oct. 24, 2018 (EP) .................................... 18202216

(51) Int. Cl.
*B60N 2/68* (2006.01)
(52) U.S. Cl.
CPC ............. *B60N 2/682* (2013.01); *B60N 2/688* (2013.01)
(58) Field of Classification Search
CPC ................................. B60N 2/682; B60N 2/688
See application file for complete search history.

(56) References Cited

U.S. PATENT DOCUMENTS

| | | | | |
|---|---|---|---|---|
| 5,263,763 A * | 11/1993 | Billette | ................ | B60N 2/3013 |
| | | | | 296/63 |
| 5,658,048 A * | 8/1997 | Nemoto | .................. | B60R 22/26 |
| | | | | 297/410 |
| 6,347,836 B1 * | 2/2002 | Hayotte | ................... | B60N 2/20 |
| | | | | 297/378.1 |
| 6,352,311 B1 * | 3/2002 | Hayotte | ................. | B60N 2/682 |
| | | | | 29/421.1 |
| 6,491,346 B1 * | 12/2002 | Gupta | ................. | B29C 49/4802 |
| | | | | 297/232 |
| 8,020,932 B2 * | 9/2011 | Yamada | ................. | B60N 2/682 |
| | | | | 297/257 |

(Continued)

FOREIGN PATENT DOCUMENTS

CN 103380025 A 10/2013

OTHER PUBLICATIONS

Apr. 18, 2019 European Search Report issue on International Application No. EP 18202216.

(Continued)

*Primary Examiner* — Philip F Gabler
(74) *Attorney, Agent, or Firm* — Clements Bernard Walker; Christopher L. Bernard

(57) ABSTRACT

A frame structure (5) for a vehicle seat backrest (3), said frame structure (5) comprising a centre frame (18) and a side frame (14), said centre frame (18) and said side frame (14) extending in a longitudinal (x), transversal (y) and vertical (z) direction, respectively, said longitudinal (x), transversal (y) and vertical (z) directions being perpendicular to each other and corresponding to a longitudinal, transversal and vertical direction, respectively, of a vehicle. Said frame structure (5) further comprises a lower connection (7) which is adapted to interconnect said centre frame (18) and said side frame (14) and which is located at or adjacent to a lower end of said frame structure (5) in said vertical direction (z).

12 Claims, 12 Drawing Sheets

(56) References Cited

U.S. PATENT DOCUMENTS

| | | | |
|---|---|---|---|
| 8,678,496 B2* | 3/2014 | Zorine | B60N 2/3013 |
| | | | 297/248 |
| 9,688,169 B2* | 6/2017 | Contorbia | B60N 2/4235 |
| 10,232,750 B2* | 3/2019 | Hamano | B60N 2/2893 |
| 10,562,428 B2* | 2/2020 | Jacob | B60N 2/20 |
| 2010/0007188 A1 | 1/2010 | Yamada et al. | |
| 2013/0341951 A1* | 12/2013 | Asai | B60N 2/015 |
| | | | 296/63 |
| 2014/0159449 A1* | 6/2014 | Kamper | B60N 2/01 |
| | | | 297/257 |
| 2016/0185261 A1* | 6/2016 | Hammann | B60N 2/235 |
| | | | 297/361.1 |

OTHER PUBLICATIONS

Office Action issued in the corresponding Chinese Patent Application No. 201910986347.0.

* cited by examiner

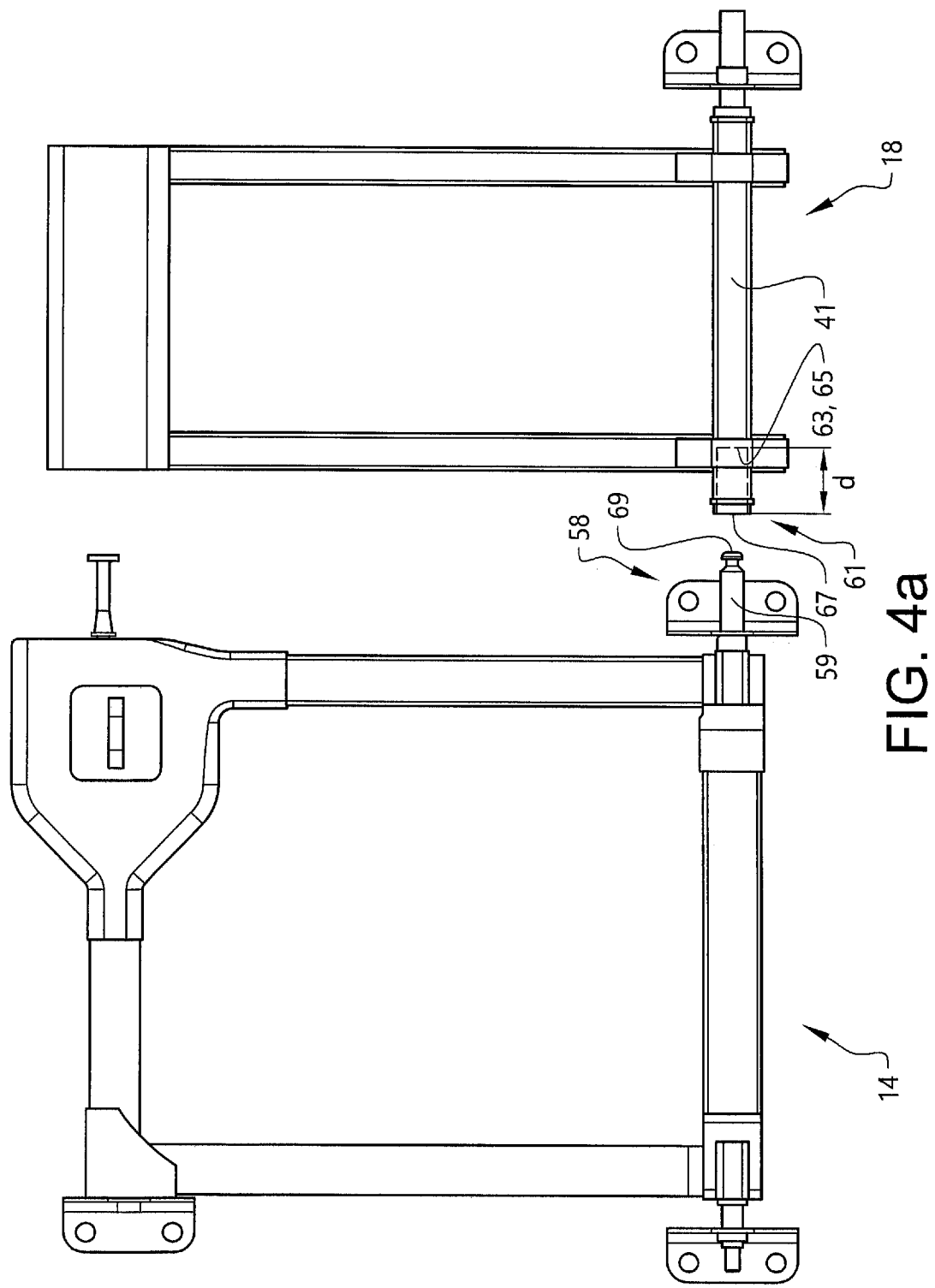

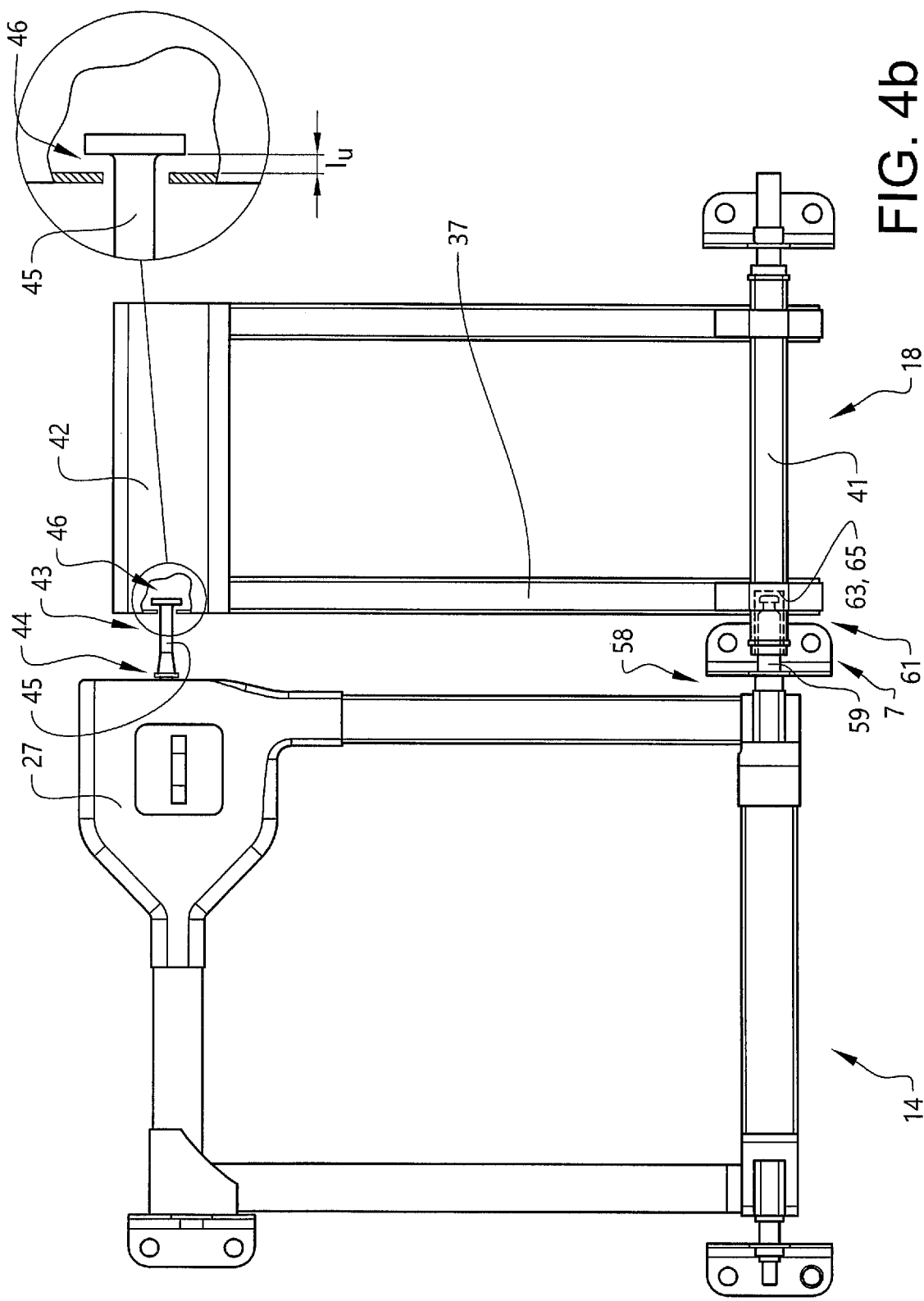

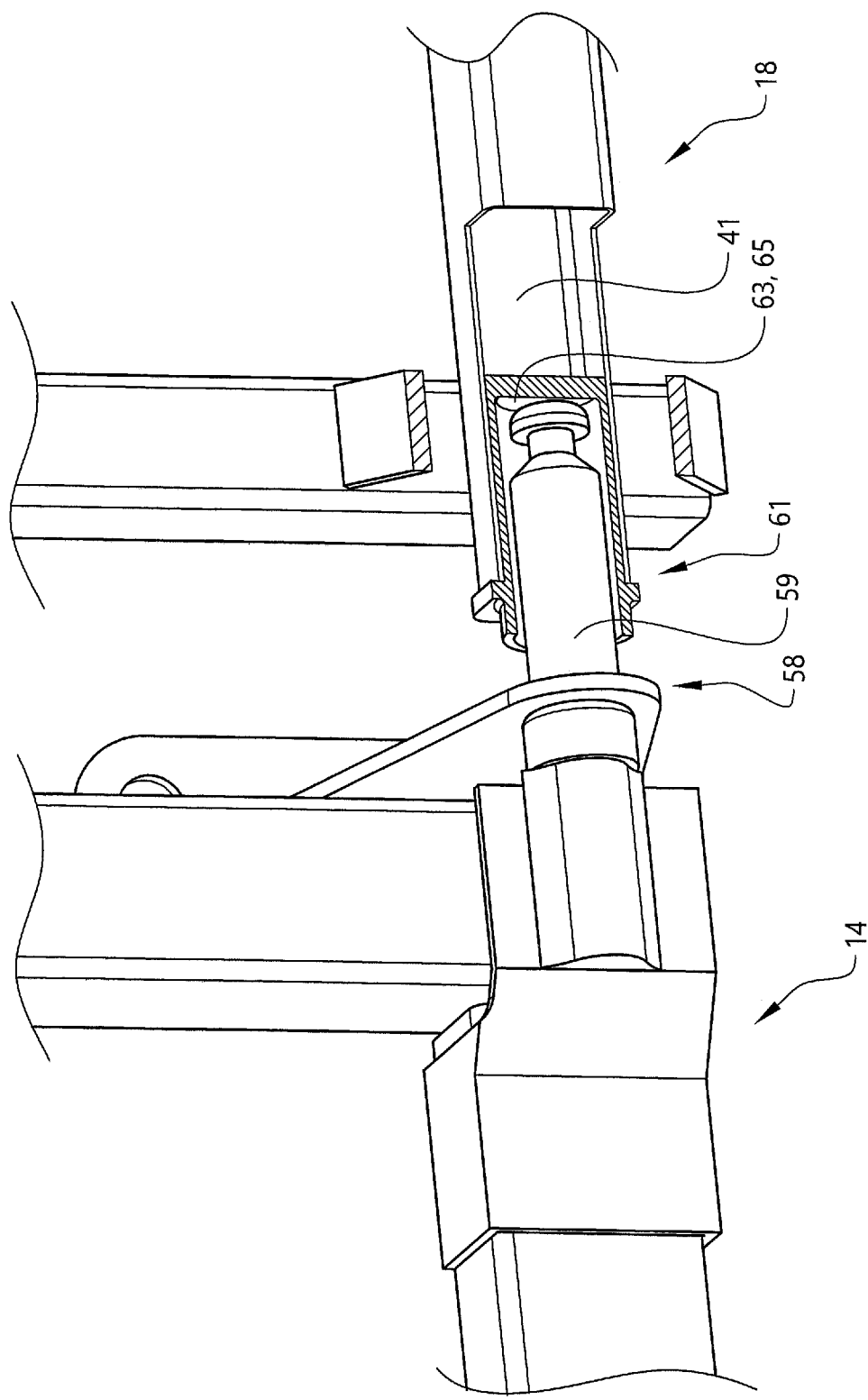

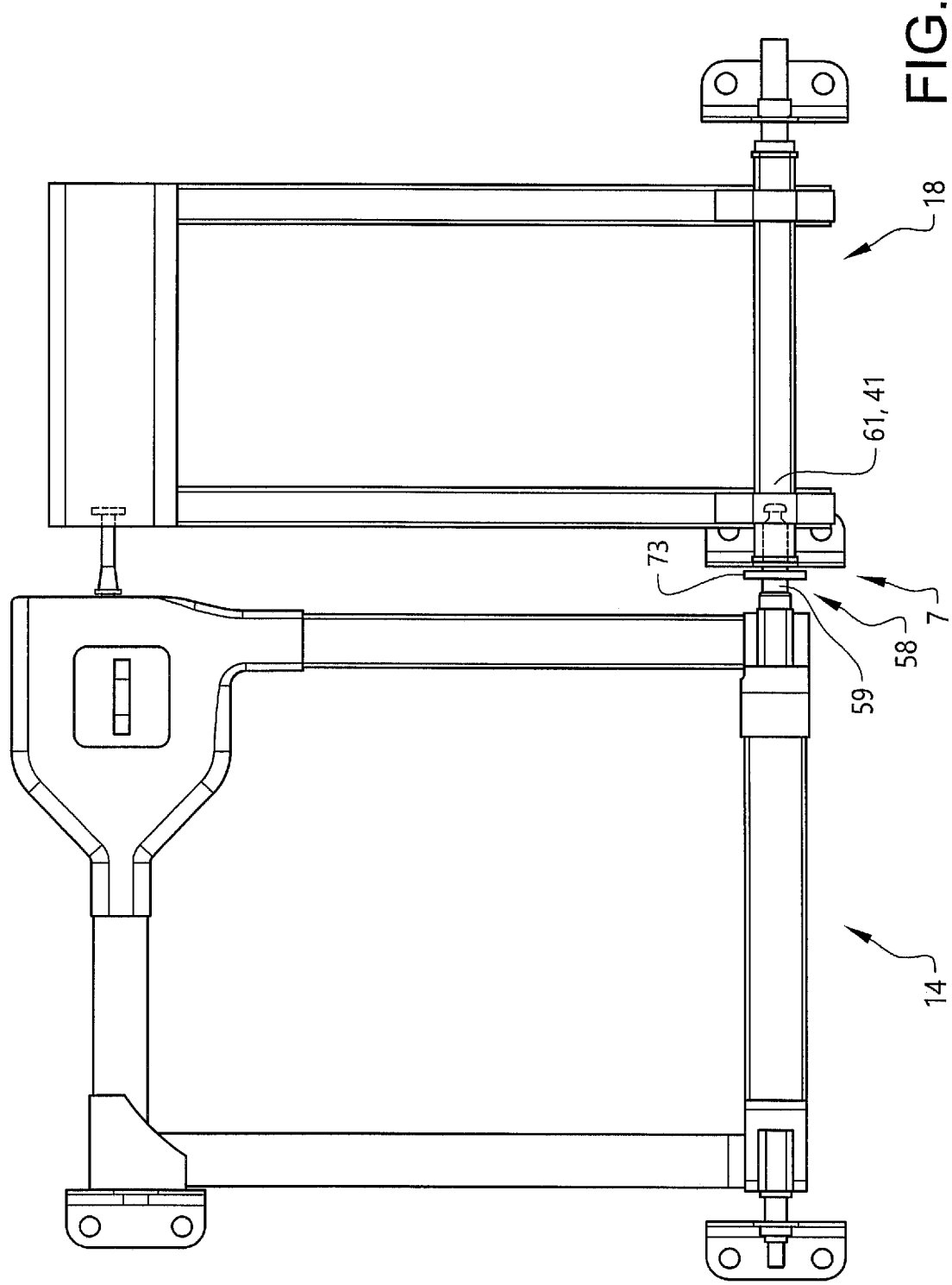

FRAME STRUCTURE FOR A VEHICLE SEAT BACKREST

CROSS-REFERENCE TO RELATED APPLICATION

The present disclosure claims the benefit of priority of co-pending European Patent Application No. 18202216.0, filed on Oct. 24, 2018, and entitled "A FRAME STRUCTURE FOR A VEHICLE SEAT BACKREST," the contents of which are incorporated in full by reference herein.

TECHNICAL FIELD

The present invention relates to a frame structure for a vehicle seat backrest. The present invention also relates to a vehicle seat backrest comprising a frame structure and a vehicle comprising a vehicle seat backrest.

BACKGROUND

Nowadays, vehicles of today are commonly equipped with safety systems, such as a seat belt, that serve the purpose of ameliorating and/or preventing injuries to an occupant of a vehicle in the event of the vehicle being involved in a collision. During a collision, e. g. a frontal collision, the occupant of a vehicle is subjected to considerable forces. This is mainly due to the drastic and high reduction in velocity of the vehicle during the collision.

The head and upper body of the occupant is lunged forward during the collision. A seat belt acts so as to retain the occupant of a vehicle in the vehicle seat and prevents the occupant from hitting the interior of the vehicle during the rapid velocity reduction of the colliding vehicle, putting great strain on the vehicle structure to which the seat belt is attached/secured.

A seat belt portion for restraining the upper body of the occupant is typically attached/fixed at one end to an upper portion of a structural frame comprised in a backrest of the vehicle seat, allowing the seat belt portion to extend between a shoulder region and a pelvic region of the occupant. In this way, during a collision, the great strain exerted on the frame structure by the seat belt load due to the forward lunging upper body of the occupant typically causes the frame structure to deflect forward to an undesirable extent, thereby potentially diminishing the protective effect and crash safety for the occupant.

It may be realized from the above that it is desirable to continuously improve vehicle passenger safety, one way being to improve crash safety performance for a vehicle seat backrest frame structure. In particular, it is desirable to improve stiffness of the frame structure to thereby reduce the forward deflection due to seat belt loads during a collision whilst still keeping the weight and complexity of the frame structure low.

SUMMARY

An object of the present invention is to overcome or ameliorate at least one of the disadvantages of the prior art, or to provide a useful alternative.

The present disclosure relates to a frame structure for a vehicle seat backrest. The frame structure comprises a centre frame and a side frame extending in a longitudinal, transversal and a vertical direction, respectively. The longitudinal, transversal and vertical directions are perpendicular to each other and correspond to a longitudinal, transversal and vertical direction, respectively, of a vehicle. The frame structure further comprises a lower connection which is adapted to interconnect the centre frame and said side frame and which is located at or adjacent a lower end of said frame structure in said vertical direction.

The lower connection comprises a male connection member being adapted to be attached to one of the side frame and the centre frame and adapted to extend in the transversal direction when attached. The lower connection also comprises a female connection member being adapted to be attached to another one of the side frame and the centre frame and adapted to extend in the transversal direction when attached. The female connection member is adapted to receive the male connection member. The male connection member or the female connection member comprises a displacement restrictor. The displacement restrictor provides a stop for insertion of the male connection member exceeding a predetermined insertion distance in at least the transversal direction, when the male connection member is connected to the female connection member.

A frame structure as recited above implies a structure which has an stiffness in the transversal direction such that a load applied to the side frame of the frame structure may in an efficient way be transmitted into the vehicle body of the vehicle via the centre frame. The displacement restrictor is adapted to enable the male connection member to be inserted a predetermined insertion distance into the female connection member. When this distance is reached the displacement restrictor acts so as to stop further insertion. The displacement restrictor is thus adapted to interact directly or indirectly with an opposed surface of the connection member to which it is not connected. In this way, the displacement restrictor may act as a load transferring surface between the male connection member and female connection member, i.e. between the side frame and centre frame. This has the positive effect of improving the transversal stiffness of the centre frame and thus the frame structure.

However, the displacement restrictor may abut or interact indirectly with the opposing connection member, solely when the male connection member and female connection member are pressed against, or pushed towards, each other, i.e. corresponding to the side frame and centre frame being pushed towards each other in the transversal direction. In the event of the reverse, i.e. when the side frame and centre frame are pulled away from each other in the transversal direction, corresponds to the male connection member being released, or disconnected, from the female connection member.

Thus, a lower connection of the frame structure as recited herein is particularly advantageous since it provides stiffness in the transversal direction of the centre frame, and thus frame structure, when the frame structure is subjected to a load that act so as to pull the centre frame towards the side frame. In this case, the displacement restrictor will stop this movement and act as a load transferring surface between the side frame and centre frame, thus increase the transversal stiffness.

The directions used herein relate to known extensions and directions of a vehicle. As such, the vehicle extends in a longitudinal direction, a transversal direction and a vertical direction, which directions are perpendicular to each other. The longitudinal direction is the normal driving direction of the vehicle. The transversal direction is a cross direction of the vehicle. Hence, the first and second transversal directions as used herein are in a seat-width direction.

A side frame as used herein comprise two vertical members having an upper end portion and a lower end portion as seen in the vertical direction, respectively. The vertical members are spaced apart and interconnected by two cross members. An upper cross member interconnects the respective upper end portions of the vertical members, and a lower cross member interconnects the lower end portions of the vertical members. Hence, the vertical members and cross members of the side frame form a closed loop of structural integrity. A centre frame as used herein may be similarly configured.

The members of the side frame and the centre frame may be tubular members that have a circular, elliptical, oval, square, rectangular or polygonal cross-section. They may be hollow or solid. The members may be formed sheet metal or composite. Furthermore, the dimensions and cross sections of respective members of the same frame may differ. However, they are connected to form a closed loop having a structural integrity. The side frame and/or centre frame may comprise other members, as alternative or complement to the vertical and cross members described above.

A frame structure as described herein is intended to provide structural support for the vehicle seat backrest. Subsequently the frame structure is adapted to be connected to the vehicle body by a plurality of attachments adapted to be connected to the frame structure.

A side and centre frame in this context indicates that the frames support separate seat positions located next to each other in a seat-width direction, such as in a rear seat of a vehicle that typically accommodates three seating positions, i.e. a centre seat interposed between a respective side seat. Hence, the terminology "side" and "centre" is used to relate location of the frames to each other by use of known orientations of the vehicle.

A frame structure comprising a side frame and a centre frame as described herein may equally well form part of a larger frame structure comprising any number of frames, i.e. intended for any number of seats, located on any side of the frame structure, i.e. to the side of the side frame and/or the to the side of centre frame.

The male connection member is adapted to fit into the female connection member, i.e. it has a cross section to the transversal direction that is smaller than that of the female connection member. Hence, the male connection member and female connection member may have differently shaped cross sections as long as the male connection member fits into the female connection member. Preferably, they have a similar cross section, such as a circular cross section.

Preferably the frame structure also comprises an upper connection which is adapted to interconnect the centre frame and the side frame, the upper connection being spaced apart from and located above said lower connection in the vertical direction. The upper connection is arranged to further strengthen and stiffen the interconnection between the side frame and the centre frame.

A cross member of the one of the side frame and the centre frame to which it is adapted to be attached may comprise or form the female connection member. The cross member has a transversal extension and has at least a portion with a hollow cross section facing said male connection member, thereby forming or comprising the female connection member. This is advantageous since a member of the centre frame initially used for another purpose may also be utilized as a female connection member.

The female connection member may be a separate part with respect to the cross member, and thus being adapted to fit in the cross member. In this way the female connection member may also provide an additional reinforcement to the cross member. As an alternative the female connection member may be an integrated part with respect to the cross member.

The displacement restrictor may comprise or consist of an inner end surface of the female connection member such that the inner end surface provides the stop for said male connection member when the male connection member is connected to the female connection member.

The female connection member extends in the transversal direction and has a hollow cross section in order to receive the male connection member. Thus the female connection member comprises a receiving end for insertion of said male connection member. The female connection member may also comprise a closed end opposite the receiving end, thus forming a bottom of the female connection member, which inner end surface may provide the displacement restrictor.

When a cross member of the centre frame is utilized as the female connection member, a closed end may be introduced into the cross member by interrupting, or closing, the hollow cross section at a predetermined insertion distance from a receiving end along the transversal extension of the cross member. In this way an integrated functionality of the cross member may be achieved when manufacturing the displacement restrictor as an integrated piece of material with respect to the cross member.

The inner end surface of the female connection member may be arranged at a depth from the receiving end of said female connection member in the transversal direction in a range of from 10 to 100 mm, preferably in a range of from 20 to 80 mm, most preferably in a range of from 40 to 70 mm. The depth in this case corresponds to the predetermined insertion distance described above. Thus, the predetermined insertion distance may be adapted depending on factors such as size and general stiffness of a frame structure and may therefore be used in a variety of vehicle seat backrest structures.

Optionally, the displacement restrictor is arranged to an outer circumference of the male connection member. In this case, the displacement restrictor has an extension larger than an extension of the receiving end of the female connection member in a direction transversal to an axial direction of the female connection member, such that the displacement restrictor is restricted from being inserted exceeding the predetermined insertion distance when the male connection member is connected to the female connection member. By way of example, the displacement restrictor may be a flange arranged to the outer circumference of the male connection member.

The displacement restrictor may be arranged at a distance from the insertion end of the male connection member, the distance being in a range of from 15 to 115 mm, preferably in a range of from 25 to 105 mm, more preferably in a range of 35 to 95, most preferably in a range of from 55 to 85 mm. The distance, in this case, corresponds to the predetermined insertion distance.

The male connection member is at one end adapted to be connected to the side frame. The male connection member further comprises an insertion end. The insertion end is adapted to be connected the female connection member by being inserted into the female connection member.

The male connection member may comprise or consist of a protruding element, such as a pin or rod, adapted to extend in the transversal direction when attached. The protruding element may have a solid cross section.

The side frame of the frame structure may comprise a seatbelt guide installation portion arranged to an upper side portion of the side frame which is located adjacent said centre frame. The seatbelt guide installation portion is adapted to guide an upper belt portion of a seatbelt, which seatbelt is intended to extend across the centre frame, thus is intended to be used in the centre position of a vehicle seat comprising the frame structure in its backrest.

The upper connection may be located at or adjacent to the seatbelt guide installation portion in the vertical direction of the frame structure. This is advantageous since the upper connection in this way in an efficient way may transfer forces exerted on the upper side portion of the side frame from the belt guide installation portion.

The upper connection may comprise or consist of a connection element, such as a pin or rod. The connection element has a first end being adapted to be connected to the side frame and a second end being adapted to be connected to the centre frame. The connection element is adapted to extend in the transversal direction when attached to the side frame.

The first end of the connection element may be permanently attached to the side frame by means of welding, or by means of an attachment means such as a screw, bolt or rivet.

The second end of the upper connection may be releasably attached to the centre frame. In this way, the centre frame may be released from the side frame at the upper connection, whilst still being connected at the lower connection, thus enabling the centre frame, or rather a centre seat backrest to be folded forwardly.

Preferably the second end may be releasably attached to a structural member, such as vertical member or a cross member, of the centre frame. Further, the second end of the connection element may be releasably attached to a member of the centre frame such that a relative movement in the transversal direction between the side frame and the centre frame, i.e. a play, is kept to a minimum. By attaching the second end of the connection element tightly to a portion of the centre frame with structural integrity, provides an increased transversal stiffness of the centre frame.

The upper connection may have a play in the transversal direction between the side frame and the centre frame that is equal to or less than 12 mm, preferably equal to or less than 6 mm, more preferably equal to or less than 4 mm, most preferably equal to or less than 2 mm.

By keeping a play in the transversal direction of the upper connection between the side frame and centre frame low, provides additional stiffness in the transversal direction of the frame structure. This is in particular advantageous when the frame structure is subjected to a load, such as belt load exerted on the upper side portion of the side frame in the event of the vehicle colliding, which load acts so as to bend or deflect the side frame forward further detailed below.

The upper connection connects the centre frame and side frame such that movements of the frames relative to each other in the transversal direction at this location are kept to a minimum. In this way, when a load is applied to the side frame as described above, an early engagement in the load event of, the displacement restrictor is achieved. Due to the minimal play of the upper connection in transversal direction between the side and centre frame, and the displacement restrictors acting as a load carrying surface, the load will in an efficient way be transferred via the centre seat as pull/push forces into the vehicle body, and the forward deflection of frame structure is reduced. Thus, a frame structure as recited above implies an increased stiffness in the transversal direction of the frame structure.

The centre frame of the frame structure may comprise a first attachment and a second attachment spaced apart in said transversal direction. The first attachment is adapted to be connected to the male connection member. In this way, forces that are carried through the centre frame are in an efficient way transferred into the vehicle body. The first attachment and the second attachment may be are adapted to be connected to a vehicle body of a vehicle in use of the frame structure.

Optionally, the centre frame of the frame structure comprises a reinforcing member extending obliquely downwards from an upper side portion of the centre frame, adjacent to the upper connection, to a lower side portion of the centre frame. This is advantageous since the reinforcing member in this way contributes to increased transversal stiffness of the centre frame.

The present disclosure also relates to a vehicle seat backrest comprising a frame structure as described herein.

The present disclosure also relates to a vehicle, such as a passenger car, comprising a vehicle seat backrest as described herein and/or a frame structure as described herein.

BRIEF DESCRIPTION OF THE DRAWINGS

The present invention will hereinafter be further explained by means of non-limiting examples with reference to the appended drawings wherein:

FIG. 1b illustrates a frame structure of the vehicle seat backrest in FIG. 1a;

FIGS. 4a to 4c illustrate a lower connection according to an embodiment of the present disclosure, and FIGS. 5a to 5c illustrate a lower connection according to another embodiment of the present disclosure.

It should be noted that the appended drawings are schematic and that individual members are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1A:
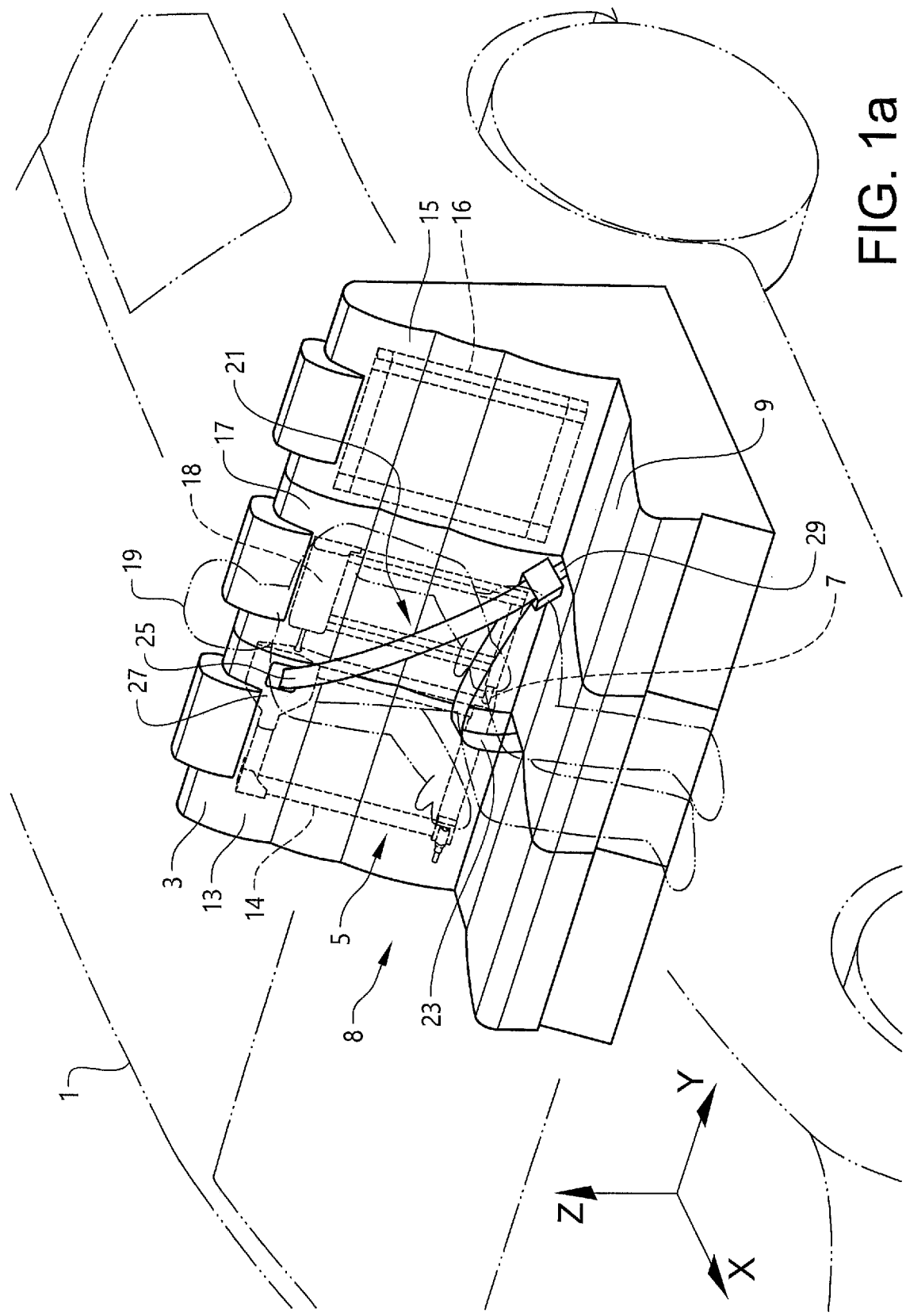
FIG. 1a illustrates a vehicle with a vehicle seat backrest according to an embodiment of the present invention.

The present disclosure and its advantage over the prior art will be further explained with reference to FIGS. 1 to 5. In FIG. 1a a vehicle 1 is disclosed comprising a vehicle seat backrest 3 for which a frame structure 5 of a kind disclosed in the present disclosure may be advantageous. The vehicle seat backrest 3 may well be implemented in any type of vehicle, such as in busses, in trucks, passenger cars, marine applications, aviation applications etc.

A vehicle seat backrest 3 as described herein typically forms part of a vehicle rear seat configured to accommodate three occupants, but may similarly be used for any other seat position for which a common seat structure for more than one occupant is desirable.

The vehicle seat 8 comprises a cushion 9 for the occupants to sit on, and a backrest 3 for the occupants to rest the back against when seated in the vehicle seat 8 facing forward in a longitudinal direction x of the vehicle 1. The backrest comprises three sections, a right-hand side section 13, a left-hand side section 15, and a centre section 17 interposed between the right-hand side section 13 and the left-hand side section 15, configured to provide support to a respective occupant.

The orientations relate to known orientations of a vehicle 1. Thus the vehicle 1 has a longitudinal direction x, a transversal direction y and a vertical direction z, the directions x, y, z being perpendicular to each other. The longitudinal direction x of the vehicle is the normal driving direction. The vertical direction z is a height direction of the vehicle. Right-hand side and left-hand side in this context relates to a seated occupant facing forwards in the longitudinal direction of the vehicle 1.

Figure 1B:
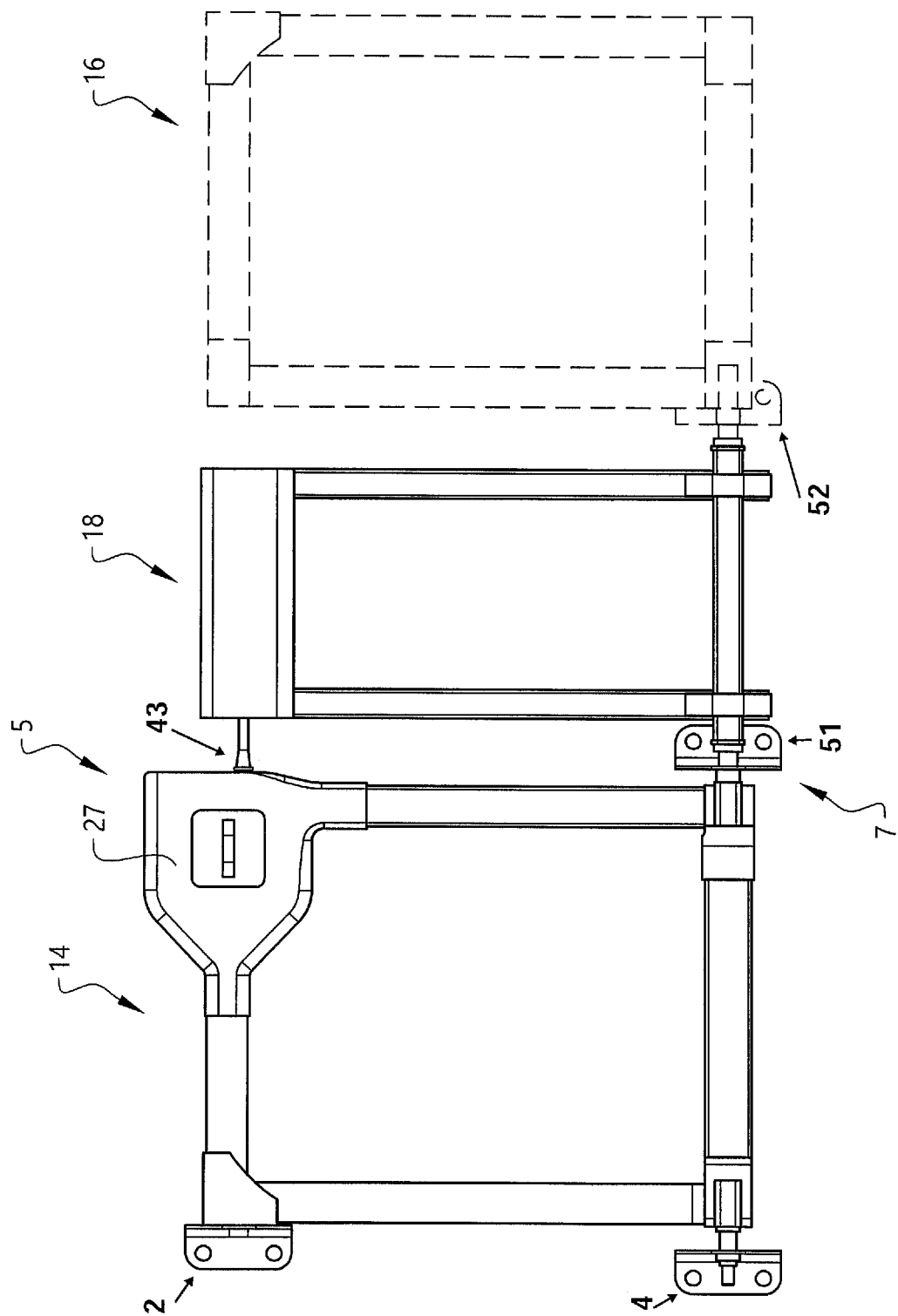

The vehicle seat backrest 3 comprises a frame structure 5. The frame structure 5 provides support for the backrest 3 and subsequently is adapted to be connected to a vehicle body of the vehicle 1 by means of a plurality of attachments 2, 4, 51, 52 adapted to be connected to the frame structure 5. The frame structure 5 as described herein comprises a side frame 14, corresponding to the right-hand side frame, and a centre frame 18, see FIGS. 1a and 1b. The side frame 14 and the centre frame 18 are configured to form a structural unit. With reference to FIGS. 1a and 1b, the vehicle seat backrest 3 also comprises a left-hand side frame 16, indicated by a dashed line, connected to the centre frame 18 of the frame structure 5. However, the focus of the present disclosure relates to the frame structure comprising the side frame 14 and centre frame 18. The frame structure 5 as described herein may in a similar manner comprise a left-hand side frame 16 and a centre frame 18.

FIG. 1a depicts a vehicle occupant 19 seated in the centre section 17. The vehicle occupant 19 is retained by a seat belt 21. The seat belt 21 comprises a lap belt portion 23 and an upper belt portion 25. The upper belt portion 25 of the seat belt 21 is attached directly to the side frame 14 of the frame structure 5 at an upper side portion 27 of the side frame 14 adjacent the centre frame 18, see also FIG. 1b. The upper side portion 27 is also referred to as a belt guide installation portion or D-loop. The upper belt portion 25 extends obliquely downwards from this location, across the centre section 17 to a belt latch buckle attachment 29, arranged to the vehicle body on the opposite side of the centre section 17 from the upper side portion 27 of the side frame.

The frame structure 5 comprises a lower connection 7 and an upper connection 43 connecting the centre frame 18 and the side frame 14. The lower connection 7 and the upper connection 43 are disclosed in FIGS. 4 and 5, and will be described in more detail further down. Initially a description of the general concept of the present disclosure will be provided based on FIGS. 1b and 2.

Figure 2:
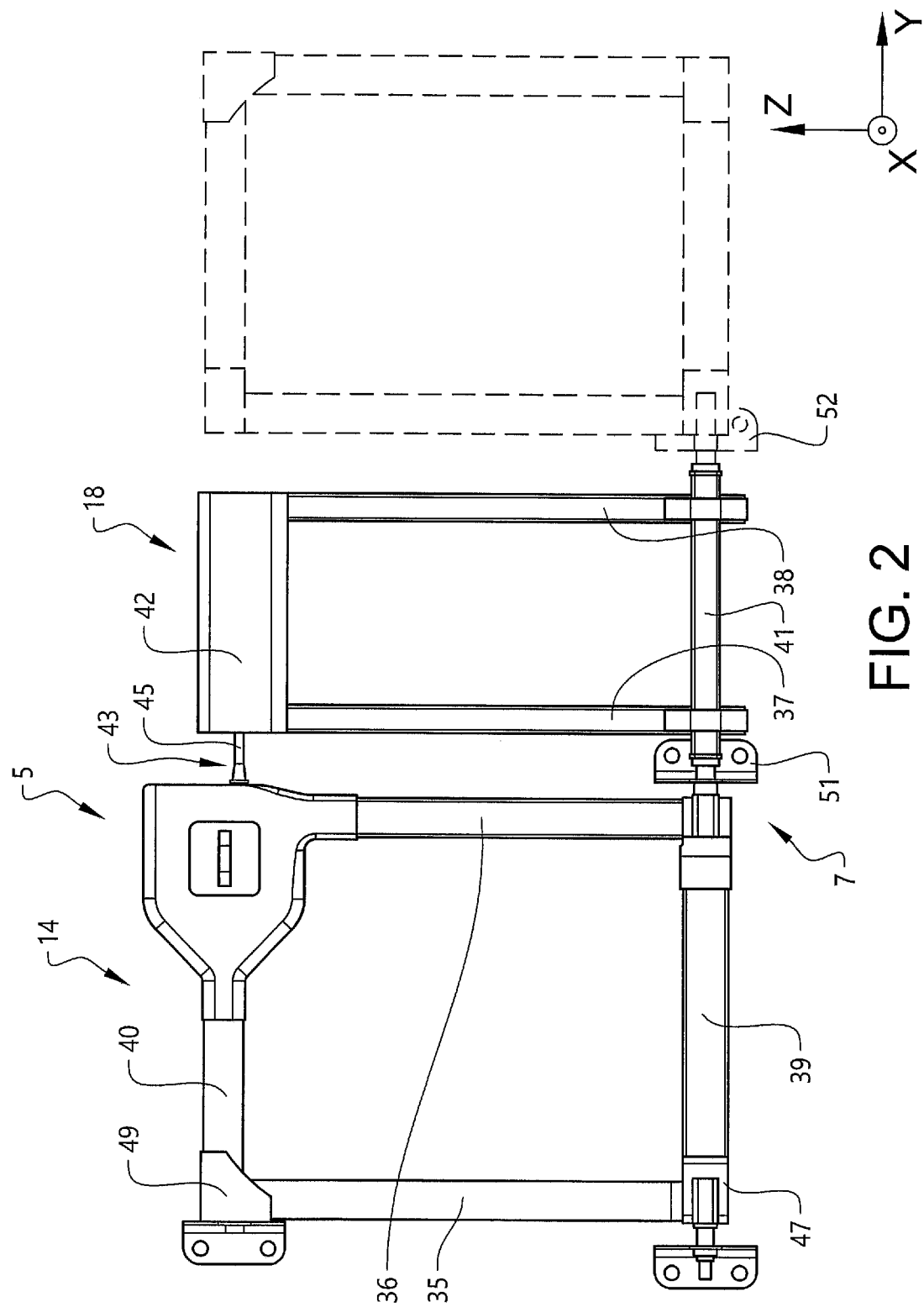
FIG. 2 illustrates a frame structure according to an embodiment of the disclosure.

With reference to FIGS. 1b and 2, the frame structure 5 of is described in more detail. The frame structure 5 comprises a side frame 14 and centre frame 18, arranged side by side and spaced apart at a distance in the transversal direction y, i.e. along the seat-width direction, based on the lower connection 7 and the upper connection 43, further detailed below. The side frame 14 and centre frame 18 provide structural support for the right-hand side section and the centre section of the vehicle seat backrest 3.

The side frame 14 comprises a pair of vertical members 35, 36 spaced apart and interconnected by means of a pair of cross members 39, 40 so as to form a substantially rectangular shape. Hence, the vertical members 35, 36 extend in the height direction z and have an upper end portion and a lower end portion respectively. The cross members 39, 40 extend in the transversal direction y and interconnect the upper end portions and lower end portions respectively. The centre frame is similarly configured, hence comprises a pair of vertical members 37, 38 spaced apart and interconnected by means of a pair of cross members 41, 42.

A vertical member and a cross member may be formed from a single piece of material comprising a curved portion, thus forming a corner segment. In this way an end portion extending in a height direction z forms the vertical member and another end portion extending in a transversal direction z forms the cross member.

The members of the side frame 14 and the centre frame 18 may be tubular members that have a circular, elliptical, oval, square, rectangular or polygonal cross-section. They may be hollow or solid. The members may be formed sheet metal or composite. Furthermore, the dimensions and cross sections of respective members of the same frame may differ. However, they are connected to form a closed loop having a structural integrity. The side frame 14 and/or centre frame 18 may comprise other members, as alternative or complement to the vertical and cross members described above.

The side frame 14 and centre frame 18 are connected by means of the lower connection 7, located at a level of the lower cross members 39, 41 of respective frame 14, 18, see FIG. 2. The side frame 14 and centre frame 18 are also connected by means of the upper connection 43 at a higher level, spaced apart from the lower connection 7 in the vertical direction z. The upper connection 43 is located at a level of the upper cross members 40, 42 of respective frame 14, 18. The lower connection 7 and the upper connection extend in a transversal direction y.

The upper connection 43 is located adjacent the upper side portion 27 of the side frame 14. The upper connection 43 comprises a connection element 45 extending in the transversal direction y. The connection element 45 is permanently attached at one end to the side frame 14. The connection of the connection element 45 to the centre frame 18 is releasable such that the centre frame 18 may be folded forward separate from the side frame 14, further detailed below with reference to FIG. 4b. The upper connection 43 fixates the side and centre frame spaced apart at a distance in the transversal direction at this location.

The frame structure 5 is connected to the vehicle body by means of attachments 2, 4 at an upper and lower corner segment 47, 49 of the side frame 14. The frame structure 5 is also connected to the vehicle body by means of a first attachment 51 and a second attachment 52 spaced apart by the centre frame 18 in the transversal direction, i.e. located on either side of the centre frame 18 in the transversal direction. The first attachment 51 is adapted to be connected to the lower connection 7. In this way, the side frame 14 and centre frame 18 are arranged and held together in relation to each other and the vehicle body.

Figure 3A:
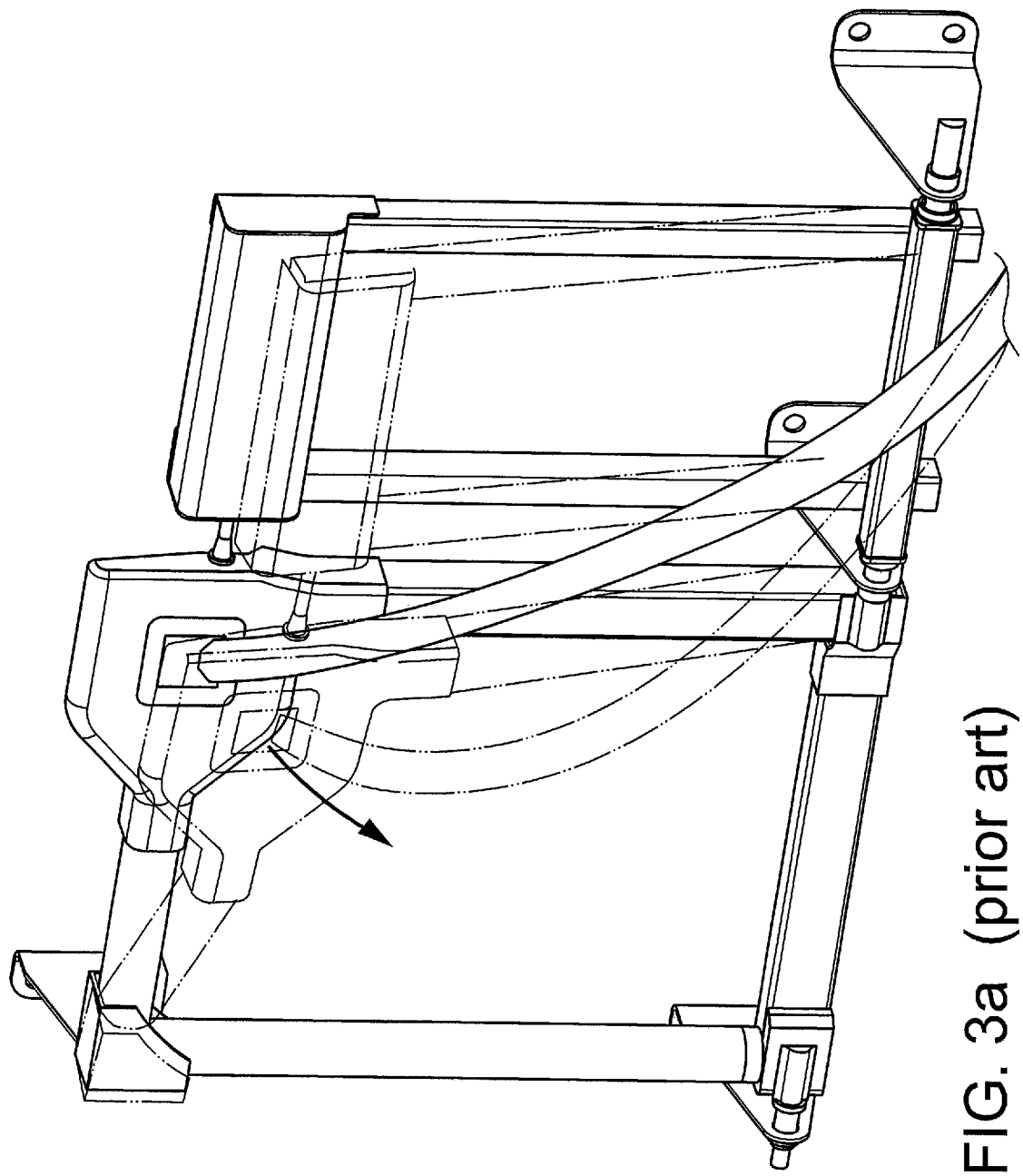
FIGS. 3a and 3b illustrate a frame structure according to prior art.

In FIG. 3a a prior art frame structure is illustrated in an unloaded state and a loaded state, indicated in dashed lines. When a vehicle is involved in a collision, e.g. a frontal or rear collision, the pelvic region of the vehicle occupant in a centre section is fixated to the seat and thus the vehicle body, by the seat belt, while the head and upper body of the occupant is lunged forward during the collision. The upper belt portion of the seat belt acts to restrain the upper body of the occupant from moving forward during the collision. Hence, the upper side portion of the side frame, comprising the belt guide attachment, is subjected to great strain, the belt load acting so as to bend the side frame forwardly and obliquely, i.e. forwardly deflect the side frame, and pulling the centre frame along. As seen, in FIG. 3a, the prior art frame structure is readily forwardly deflected by the belt load, indicated by the black arrow. This is further illustrated by visualizing the forces acting on the members of the prior art frame structure, see FIG. 3b.

Figure 3B:
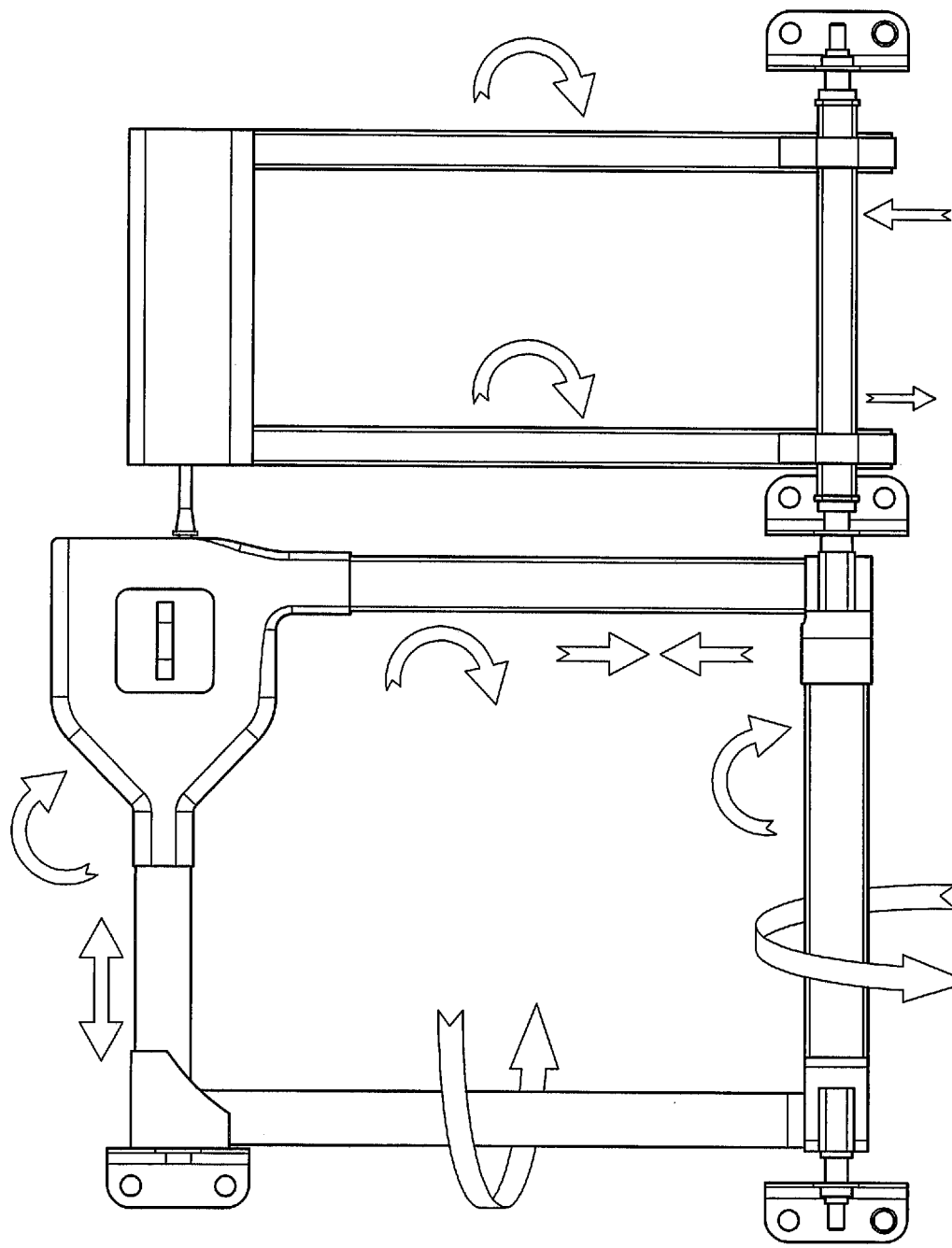

The prior art frame structure as illustrated in FIGS. 3a and 3b, is configured such that the side frame typically carries the belt load during a collision as described above, whilst the centre frame, generally follows the movement of the side frame, without significantly contribute to carrying an applied load. This is due to that the connections between the frames of the prior art frame structure, is of a sliding type in the transversal direction, i.e. enabling a relatively large movement between the frames. Hence, the centre frame in the prior art solution may be regarded as more or less being hanged onto the side frame the centre frame and may thus only to a limited extent contribute to carrying the load acting on the side frame. Furthermore, as illustrated in FIG. 3b, the centre frame will in this way experience the load to which the side frame is subjected to, i.e. bending forces.

Figure 3C:
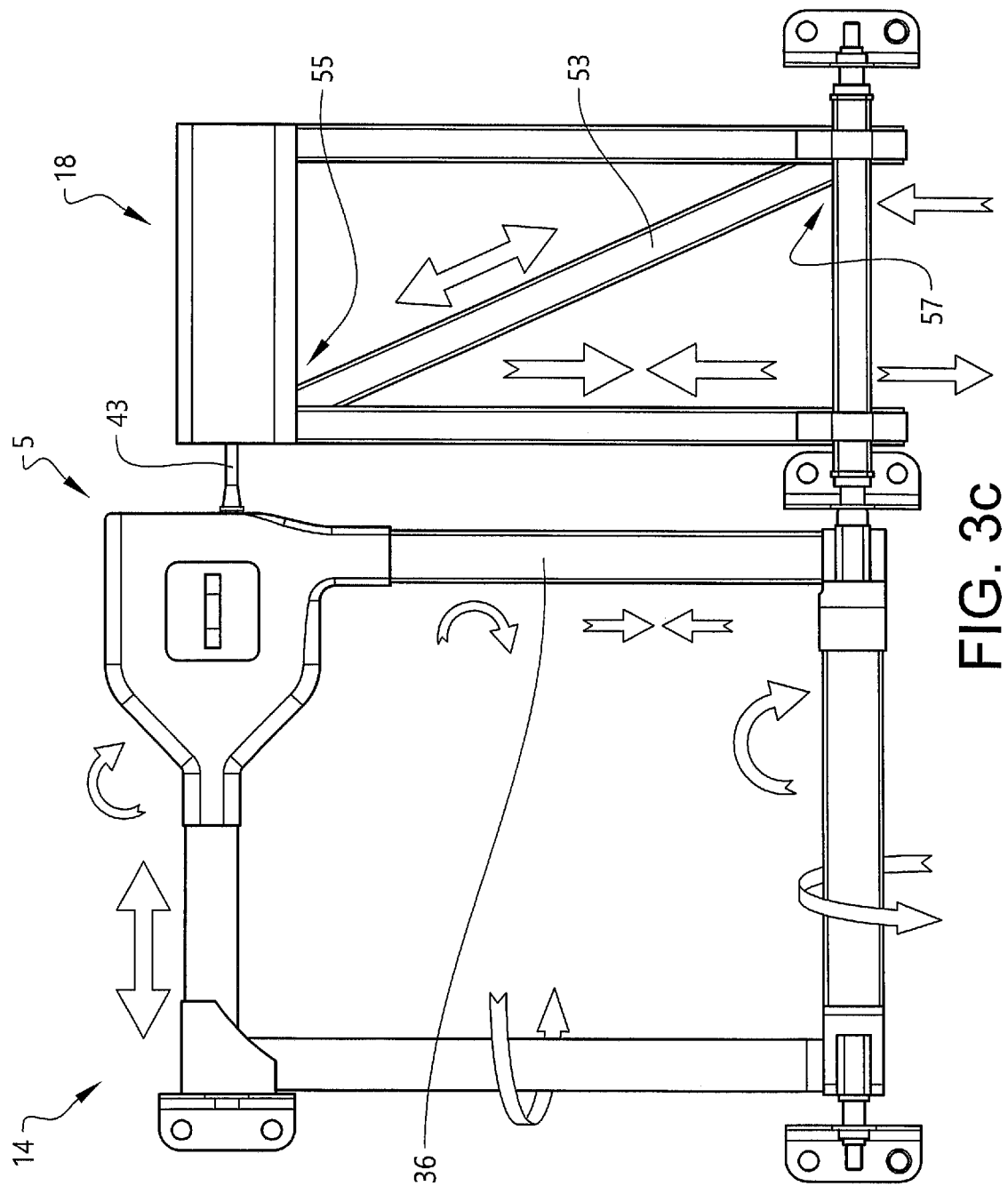
FIG. 3c illustrates a frame structure according to an embodiment of the present disclosure.

A frame structure 5 as described herein contributes to significantly reduce the forward deflection of the frame structure 5 when subjected to a belt load as described above. FIG. 3c illustrates the forces acting on a frame structure 5 according to the present disclosure when subjected to a belt load, as compared to the prior art solution in FIG. 3b. As readily seen, bending forces are reduced in the side frame 14 vertical member 36 adjacent to the centre frame 18. The centre frame 18 experiences increased pull/push forces and less bending moment and as a result the forward deflection of the frame structure 5 is reduced.

In the embodiment of the frame structure 5 in FIG. 3c, the centre frame 18 has a reinforcing member 53 extending obliquely downwards from an upper side portion 55 of the centre frame 18 adjacent to the upper connection 43 to a lower side portion 57 of the centre frame 18 opposite side from the upper side portion 55. The reinforcing member 53 additionally improves the transversal stiffness of the centre seat. The reinforcing member 53 represents an alternative embodiment of the centre frame 18 of the frame structure 5 as described herein, and as such, it adds to the positive effects of the connections of the frame structure, i.e. reducing the forward deflection of the frame structure is achieved also without the reinforcing member 53.

With reference to FIGS. 4a to 4c, an embodiment of the lower connection 7 of the frame structure will be described in more detail. FIG. 4a shows an exploded view of the lower connection 7 and FIG. 4b shows the side frame 14 and centre frame 18 connected by the lower connection 7. The upper connection 43 connecting the side frame 14 and centre frame 18 at the level of the upper side portion 27 of the side frame 14 is also illustrated and will be further detailed below. FIG. 4c shows a detailed view of the lower connection 7.

The lower connection 7 comprises a male connection member 58 arranged to the side frame 14. The male connection member 58 comprises a protruding element 59 that extends in the transversal direction y, see FIG. 4a. The protruding element 59 may be e.g. a pin or a rod, attached to the side frame 14 by means of welding or by means of an attachment means such as a screw, bolt or rivet. The protruding element 59 in FIGS. 4a to 4c has a circular cross section. However, the male connection member 59 may have an elliptical, oval, square, rectangular or polygonal cross section.

The lower connection 7 further comprises a female connection member 61 arranged to the centre frame 18 and extending in the transversal direction y. The female connection member 61 is adapted to receive the male connection member 59, i.e. the protruding element 59. The female connection member 61 has a hollow cross section, and the male connection member 58 is appropriately sized and shaped to be arranged in the female connection member 61.

The female connection member comprises a displacement restrictor 65. The displacement restrictor 65 provides a stop for insertion of the male connection member 58 exceeding a predetermined insertion distance in at least the transversal direction y, when the male connection member 58 is connected to the female connection member 61, see FIG. 4b.

The cross member 41 of the centre frame 18 comprises the female connection member 61. An inner end surface 63 of the female connection member forms the displacement restrictor 65. Thus, provides the stop for insertion of the male connection member 58, 59 exceeding the predetermined insertion distance when the male connection member 58, 59 is connected to the female connection member 61, see FIG. 4b. The inner end surface 63 thus has an extension at a perpendicular or substantially perpendicular angle to the transversal direction.

The inner end surface 63 is located at a depth d in the transversal direction from a receiving end 67 of the female connection member 61 facing the side frame 14. The depth d may be in a range of from 10 to 100 mm, preferably in a range of from 20 to 80 mm, most preferably in a range of from 40 to 70 mm. The depth d corresponds to the predetermined insertion distance in this case.

When the side frame 14 and centre frame 18 are connected by means of the lower connection, an insertion end surface 69 of the male connection member 58, 59 is snuggly arranged against the inner end surface 63 of the he female connection member 61. In this way the side frame 14 and centre frame 18 are restricted from being pushed together further. The inner end surface 63 may act as a load transferring surface, being in direct contact with the insertion end surface 69 of the male connection member 58, 59, between the side frame 14 and centre frame 18 which implies that stiffness is improved in this transversal direction of the lower connection 7.

The displacement restrictor 65 may be referred to as uni-directional in this context, since it restricts displacement of the centre frame 18 towards the side frame 14 in the transversal direction, such as when the frame structure is subjected to a load as described above. However, the displacement restrictor 65 does not restrict displacement in the opposite transversal direction, since this instead releases or disconnects the male connection member 58, 59 from the female connection member 61.

This is an advantageous configuration since when a belt load is applied to the upper side portion 27 of the side frame 14, acting so as to bend the side frame 14 forwardly and obliquely, the centre frame, via the connection to the side frame, will also experience being drawn forwardly and obliquely following the side frame 31. However, the displacement restrictor 65 will act against these forces by directly interacting with the male connection member 58, 59 and prevent displacement of the centre frame 18 towards the side frame 14. Hence, stiffness is improved in the transversal direction y of the frame structure 5. The applied belt load in the side frame 14 will in an efficient way be guided through the centre frame 18. In other words, the lower connection 7 will contribute in transforming bending forces to push/pull forces in the frame structure which reduces the forward deflection of the frame structure.

A lower connection 7 as described herein may provide stiffness solely when the centre frame 18, via the female connection member 61 is pushed against the male connection member 58, 59 and side frame 14. However, centre frame may be displaced away from the side frame in the transversal direction so as to disconnect the lower connection 7 and release the male connection member 58 from the female connection member 61, not taking into account the upper connection or attachments to the vehicle body. The upper connection 43 attaches the side frame 14 to centre frame 18 and thus contributes to preventing complete separation of the lower connection 7.

With reference to FIG. 4b, the upper connection 43 as described herein is described in further detail. The upper connection 43 comprises a connection element 45 extending in the transversal direction y. The connection element 45 has a first end 44 permanently attached to the side frame 14 and a second end 46, opposite the first end 44, releasably attached to the upper cross member 42 of the centre frame 18. The second end 46 of the connection element 45 is attached to the upper cross member 42 such that a relative movement in the transversal direction between the side frame 14 and the centre frame 18, i.e. a play $l_u$, is kept to a minimum.

The upper connection 43 may have a play $l_u$ in the transversal direction y between the side frame 14 and the centre frame 18 that is equal to or less than 12 mm, preferably equal to or less than 6 mm, more preferably equal to or less than 4 mm, most preferably equal to or less than 2 mm.

Figure 5A:
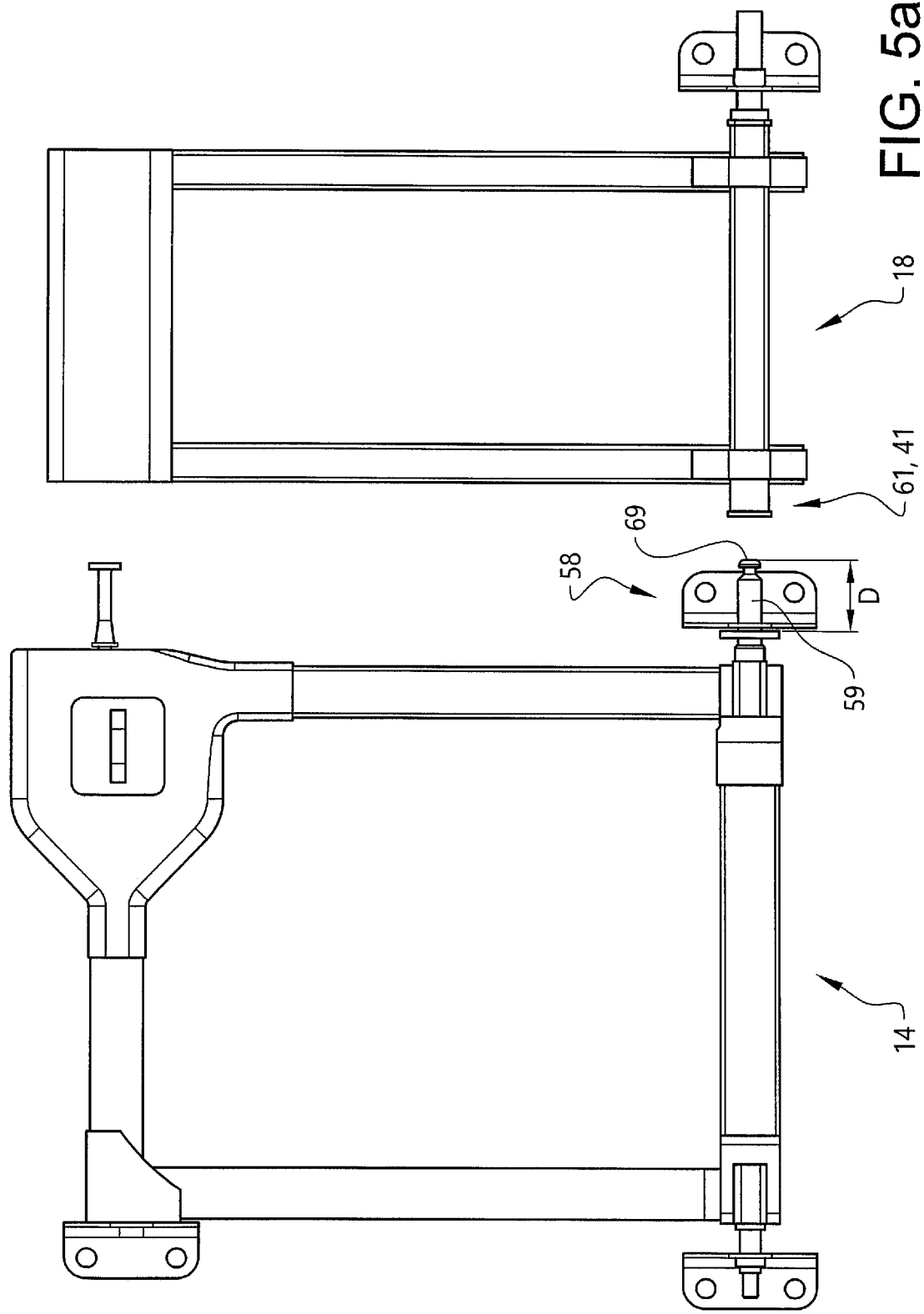
Figure 5C:
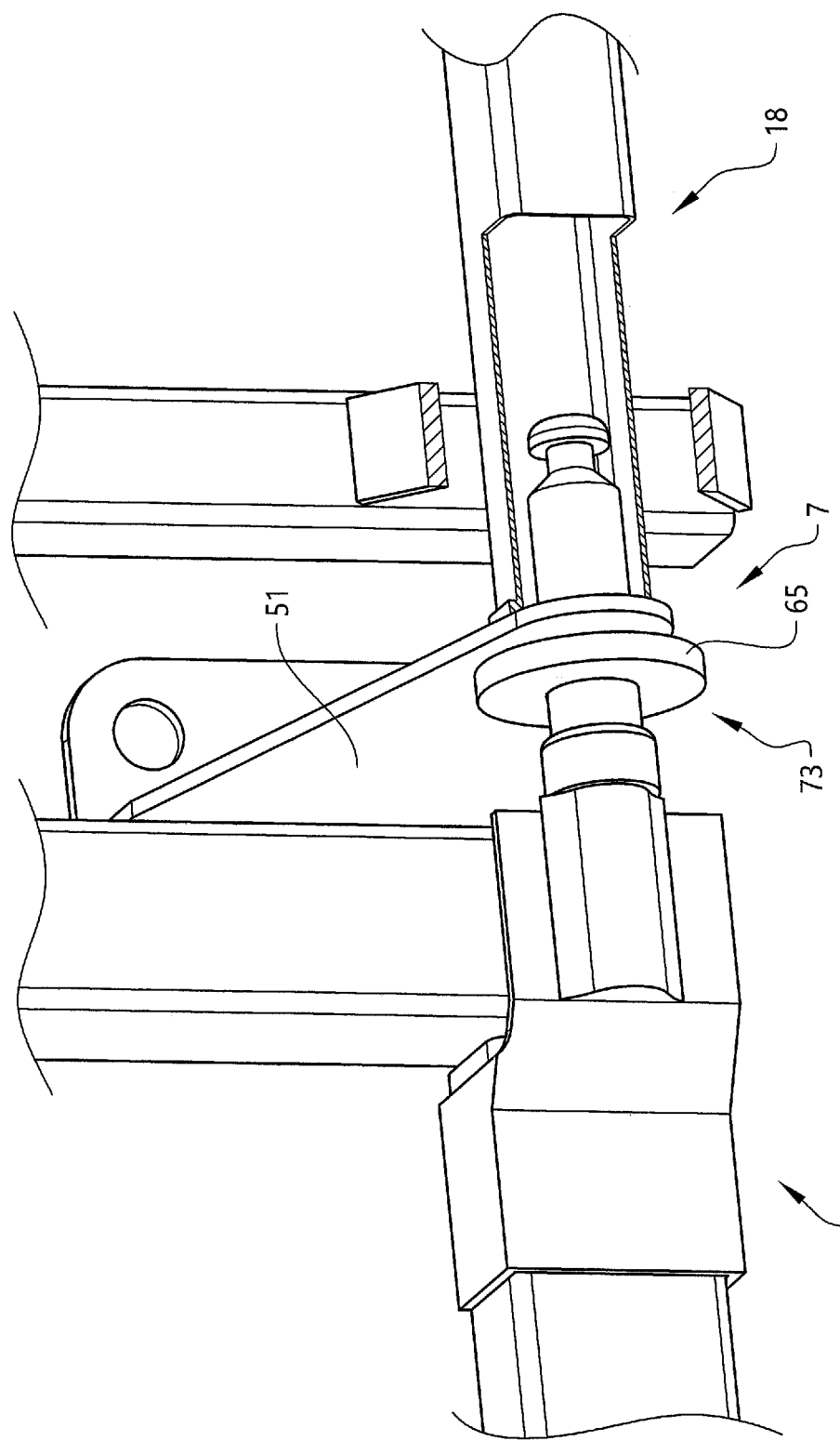

Another embodiment of the lower connection 7 as described herein is disclosed in FIGS. 5a to 5c. FIG. 5a shows an exploded view of the lower connection 7 and FIG. 4b shows the side frame and centre frame connected by the lower connection 7. FIG. 4c shows a detailed view of the lower connection 7.

In this embodiment the displacement restrictor 65 is arranged to an outer circumference of the male connection member 58, 59 and at a distance D from the insertion end surface 69 of the male connection member 58, 59. The distance D may be in a range of from 15 to 115 mm, preferably in a range of from 25 to 105 mm, more preferably in a range of 35 to 95, most preferably in a range of from 55 to 85 mm. The distance D corresponds to the predetermined insertion distance in this case.

In the embodiment of FIGS. 5a to 5c the displacement restrictor 65 is formed by a flange 73 attached to the protruding element 59. The flange is rigidly attached by means of welding for example. The displacement restrictor 65 has an extension that is greater than the extension of the female connection member 61 in a direction perpendicular to or substantially perpendicular to the transversal direction y.

In this way the displacement restrictor 65 is restricted from being inserted into the female connection member 61 when the male connection member 58, 59 is arranged in the female connection member 61. The displacement restrictor 65 in FIGS. 5a to 5c, i.e. the flange, has a circular cross section. The circular cross section of the flange is greater than the rectangular cross section of the cross member 41. The female connection member 61 is comprised in the cross member 41. The attachment to the vehicle body 51, located at the lower connection 7, is interposed between the displacement restrictor 65 and the female connection member 61, see FIGS. 5b and 5c, thus the displacement restrictor 65 in this embodiment interacts indirectly with the female connection member 61.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A frame structure for a vehicle seat backrest, said frame structure comprising a centre frame and a side frame,
said centre frame and said side frame extending in a longitudinal (x), transversal (y) and vertical (z) direction, respectively,
said longitudinal (x), transversal (y) and vertical (z) directions being perpendicular to each other and corresponding to a longitudinal, transversal and vertical direction, respectively, of a vehicle,
said frame structure further comprising a lower connection which is adapted to interconnect said centre frame and said side frame and which is located at or adjacent a lower end of said frame structure in said vertical direction (z),
wherein said lower connection comprises
a male connection member being adapted to be attached to one of said side frame and said centre frame and adapted to extend in said transversal direction (y) when attached, and
a female connection member being adapted to be attached to another one of said side frame and said centre frame and adapted to extend in said transversal direction (y) when attached, said female connection member being disposed concentrically within an opening formed in a terminating end of a lower cross member of said another one of said side frame and said centre frame and adapted to receive said male connection member within said female connection member and within said opening formed in said terminating end of said lower cross member of said another one of said side frame and said centre frame such that said male connection member is coaxially disposed within said female connection member within said lower cross member, wherein said lower cross member spans a distance between a pair of vertical members of said another one of said side frame and said centre frame,
wherein said male connection member or said female connection member comprises a displacement restrictor, said displacement restrictor providing a stop for insertion of said male connection member exceeding a predetermined insertion distance in at least said transversal direction (y), when said male connection member is connected to said female connection member, and
said frame structure further comprising an upper connection which is adapted to interconnect said centre frame and said side frame, said upper connection being spaced apart from and located above said lower connection in said vertical direction (z), wherein said upper connection is located at or adjacent to a seatbelt guide installation portion arranged to an upper side portion of said side frame which is located adjacent said centre frame in a vertical direction (z) of said frame structure,
wherein said upper connection comprises a connection element having a first end and a second end, wherein said connection element is T-shaped such that said first end extends in said transversal direction (y) and said second end extends in said vertical direction (z), wherein said first end is adapted to be permanently attached to said side frame, and wherein said second end is adapted to be releasably attached to a member of the centre frame such that a play in the transversal direction (y) between said side frame and said centre frame is kept to a predetermined minimum.

2. The frame structure of claim 1, wherein said lower cross member of said another one of said side frame and said centre frame forms or comprises said female connection member, said lower cross member extending in said transversal direction (y) and having at least a portion with a hollow cross section facing said male connection member, thereby forming or comprising said female connection member.

3. The frame structure of claim 2, wherein said female connection member is a separate part with respect to said lower cross member and is adapted to fit into said lower cross member, or an integrated part with respect to said lower cross member.

4. The frame structure of claim 1, wherein said inner end surface is arranged at a depth (d) from a receiving end of said female connection member in said transversal direction (y), said depth (d) being in a range of from 10 to 100 mm.

5. The frame structure of claim 1, wherein said displacement restrictor is arranged to an outer circumference of said male connection member, said displacement restrictor having an extension larger than an extension of said female connection member in a direction transversal to an axial direction of said female connection member, such that said displacement restrictor is restricted from being inserted into said female connection member when said male connection member is connected to said female connection member.

6. The frame structure of claim 5, wherein said displacement restrictor is arranged at a distance (D) in said transversal direction (y) from an insertion end of said male connection member, said distance (D) being in a range of from 15 to 115 mm.

7. The frame structure of claim 1, wherein said male connection member comprises or consists of a protruding element adapted to extend in said transversal direction (y) when attached.

8. The frame structure of claim 1, wherein said upper connection has a play in said transversal direction (y) between said side frame and said centre frame, said play being equal to or less than 12 mm.

9. The frame structure of claim 1, wherein said centre frame of said frame structure comprises a first attachment and a second attachment spaced apart in said transversal direction (y), said first attachment being adapted to be connected to said male connection member, wherein said first attachment and said second attachment are adapted to be connected to a vehicle body of a vehicle in use of the frame structure.

10. The frame structure of claim 1, wherein said centre frame comprises a reinforcing member extending obliquely downwards from an upper side portion of said centre frame adjacent to an upper connection to a lower side portion of said centre frame.

11. A vehicle seat backrest comprising the frame structure of claim 1.

12. A vehicle comprising the vehicle seat backrest of claim 11.

* * * * *